United States Patent
Kim et al.

(10) Patent No.: US 9,490,663 B1
(45) Date of Patent: Nov. 8, 2016

(54) APPARATUS AND METHODOLOGY FOR BATTERY BACKUP CIRCUIT AND CONTROL IN AN UNINTERRUPTIBLE POWER SUPPLY

(75) Inventors: Sangsun Kim, San Jose, CA (US); Ken Krieger, Jackson, WY (US)

(73) Assignee: Google Inc., Mountain View, CA (US)

( * ) Notice: Subject to any disclaimer, the term of this patent is extended or adjusted under 35 U.S.C. 154(b) by 789 days.

(21) Appl. No.: 13/550,054

(22) Filed: Jul. 16, 2012

(51) Int. Cl.
*H02J 9/06* (2006.01)
*H02J 7/00* (2006.01)

(52) U.S. Cl.
CPC .............. *H02J 9/062* (2013.01); *H02J 7/0031* (2013.01)

(58) Field of Classification Search
None
See application file for complete search history.

(56) References Cited

U.S. PATENT DOCUMENTS

| | | | |
|---|---|---|---|
| 5,289,046 A | 2/1994 | Gregorich et al. | |
| 5,920,129 A | 7/1999 | Smith | |
| 6,169,669 B1* | 1/2001 | Choudhury | H02J 9/062 307/66 |
| 6,314,007 B2* | 11/2001 | Johnson, Jr. | 307/66 |
| 6,542,023 B1 | 4/2003 | Daun-Lindberg et al. | |
| 6,605,879 B2 | 8/2003 | Wade et al. | |
| 6,693,806 B2* | 2/2004 | Uchida | 363/50 |
| 6,856,047 B2* | 2/2005 | Murabayashi | H02J 1/102 307/150 |
| 6,903,533 B1* | 6/2005 | Geren et al. | 320/134 |
| 7,049,711 B2* | 5/2006 | Kanouda | H02J 9/061 307/66 |
| 7,245,469 B2* | 7/2007 | Nemoto et al. | 361/65 |
| 7,564,220 B2* | 7/2009 | Niculae | H02J 7/0013 320/131 |
| 7,679,943 B2* | 3/2010 | O'Bryant | H02J 9/061 363/65 |
| 7,705,562 B2* | 4/2010 | Takahashi et al. | 320/128 |
| 7,737,580 B2 | 6/2010 | Hjort et al. | |
| 8,116,105 B2 | 2/2012 | Klikic et al. | |
| 8,138,706 B2* | 3/2012 | Ochsenbein et al. | 318/563 |
| 2002/0153865 A1 | 10/2002 | Nelson et al. | |
| 2006/0050465 A1 | 3/2006 | Cho et al. | |
| 2007/0075684 A1* | 4/2007 | Liu | H02J 7/0031 320/128 |
| 2007/0278860 A1* | 12/2007 | Krieger | H02J 9/061 307/64 |
| 2008/0211308 A1* | 9/2008 | Lin | H02J 9/062 307/65 |
| 2008/0252144 A1* | 10/2008 | Wang | H02J 9/062 307/66 |
| 2009/0021078 A1* | 1/2009 | Corhodzic et al. | 307/67 |
| 2009/0129128 A1* | 5/2009 | Hirahara | H02J 9/061 363/49 |
| 2011/0133560 A1* | 6/2011 | Yamashita | G06F 1/30 307/66 |
| 2012/0007428 A1* | 1/2012 | Rozman | H02J 3/36 307/66 |
| 2012/0319653 A1* | 12/2012 | Kumar | H02J 7/0013 320/118 |

* cited by examiner

*Primary Examiner* — Rexford Barnie
*Assistant Examiner* — David Shiao
(74) *Attorney, Agent, or Firm* — Fish & Richardson P.C.

(57) ABSTRACT

Systems and methods for providing an uninterruptible power supply are disclosed herein. The system includes a power converter component that concurrently provides power to a load and charges a battery by using a primary power source. The system also includes a backup component that delivers power from the battery to the load during a primary power failure. Additionally, a set of series transistors are coupled to the battery to control charging current and discharging current of the battery.

18 Claims, 12 Drawing Sheets

APPARATUS AND METHODOLOGY FOR BATTERY BACKUP CIRCUIT AND CONTROL IN AN UNINTERRUPTIBLE POWER SUPPLY

TECHNICAL FIELD

The subject disclosure relates to power supplies and, more particularly, to a power supply with an uninterruptible source of power.

BACKGROUND

An uninterruptible power supply (UPS) refers to a system that provides backup power to a load during loss of an input power source. Often times, the backup power is provided by a battery. UPS systems are used in various applications where continuous power is needed. For example, a UPS system can be implemented to protect electrical systems from corruption and/or loss of data. During normal operation of common UPS systems, a primary power source supplies power to the load and also charges the battery. During loss, malfunction or non-operation of the primary power source, the backup battery supplies power to the load. As a result, an uninterruptible supply of power can be continuously provided to the load. Conventional UPS systems do not provide for intelligent control of backup battery power. It would be desirable to have a simplified circuit and/or intelligent control that improves efficiency and reliability of backup power in UPS systems.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

The systems and methods disclosed herein relate to a backup component coupled to a battery and a power converter component to provide power from the battery to a load when a primary power failure is detected in the power converter component. Additionally, a set of transistors is coupled to the battery to control charging current and discharging current of the battery. In one implementation, the set of transistors form a bi-directional switch. In another implementation, the backup component and the set of transistors provide redundant failure detection. For example, a control component turns off the set of transistors during a fault condition.

Furthermore, a non-limiting implementation provides for converting a primary power source into direct current (DC) power, concurrently using the DC power to drive a load and store a portion of the DC power in a battery, controlling a rate for delivering the DC power to the battery using a set of transistors, using the stored power to drive the load upon unavailability of the primary power source, and controlling a rate for powering the load using the set of transistors.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
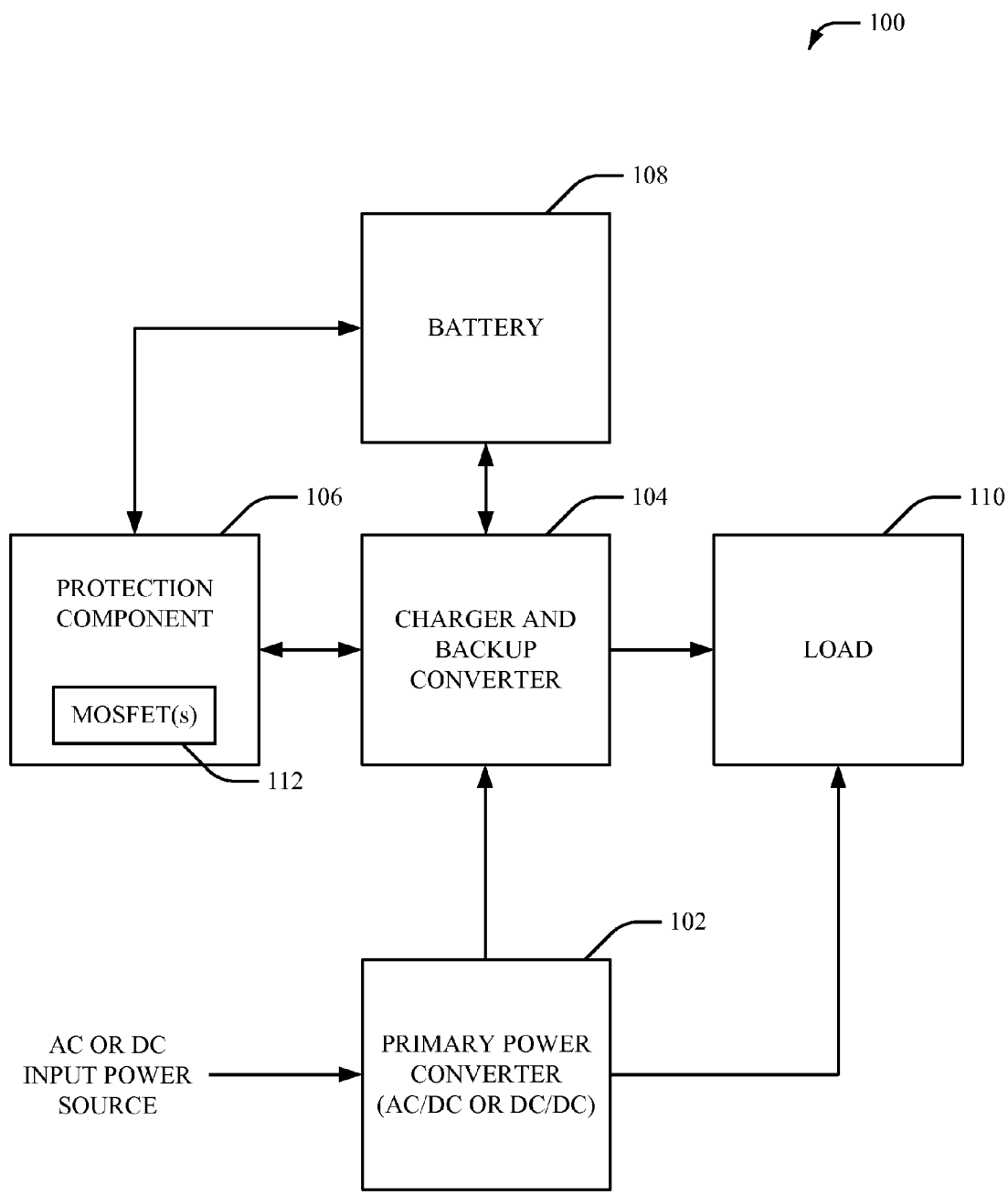
FIG. 1 illustrates an example functional block diagram implementation of an uninterruptible power supply architecture.

Various aspects or features of the subject disclosure are described with reference to the drawings, wherein like reference numerals are used to refer to like elements throughout. In the subject specification, numerous specific details are set forth in order to provide a thorough understanding of the subject disclosure. It may be evident, however, that the disclosed subject matter may be practiced without these specific details, or with other methods, components, materials, etc. In other instances, well-known structures and devices are shown in block diagram form in order to facilitate describing the subject disclosure.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification are not necessarily all referring to the same implementation. Furthermore, the particular features, structures, or characteristics may be combined in any suitable manner in one or more implementations.

Uninterruptible power supply (UPS) systems are generally utilized to provide a continuous supply of power to a load. According to an aspect of the subject disclosure, systems and methods disclosed herein provide a set of metal-oxide-semiconductor field-effect transistors (MOSFETs) coupled in series with each other and coupled to a backup battery to control both charging and discharging of the backup battery. In one implementation, the MOSFETs allow a UPS system to be implemented without a battery charger. The MOSFETs are controlled by a protection component and create an open circuit condition at the battery if the charging or discharging current (or voltage) of the battery is outside a predetermined range. Furthermore, the MOSFETs and a backup converter can both detect failure in the UPS system, thereby providing redundancy to disconnect the battery from the load. According to another aspect of the subject disclosure, a primary power source concurrently charges the backup battery and powers a load.

Referring initially to FIG. 1, there is illustrated an example system 100 that provides an uninterruptible power supply, according to an aspect of the subject disclosure. Specifically, the system 100 can provide a protection feature that can be utilized in most any uninterruptible power supply application, for example, by implementing a redundant set of transistors. Typically, uninterruptible power supplies can be employed by various systems, for example, distributed power systems, high availability servers (e.g., Telecom servers), disk arrays, powered insertion boards, and the like.

In particular, the system 100 includes a charger and backup converter component 104 coupled to a power converter component 102, for example, a primary power converter (e.g., an alternating current (AC) to direct current (DC) converter or a DC/DC power converter), a battery 108, and a load 110. In one example, the primary power converter component 102 receives an input power source (e.g., an AC or DC power source). As such, the primary power converter component 102 can concurrently provide power to the load 110 and charge the battery 108 using the primary input power source. The component 104 can controllably deliver power from the battery 108 to the load 110 when a primary power failure is detected in the primary power converter component 102. The component 104 can also controllably deliver charging current and voltage to the battery 108 when a primary power failure is not detected. A primary power failure can occur, for example, when the primary input power source becomes unavailable to the primary power converter component 102.

Additionally, a protection component 106 can be coupled to the component 104 and the battery 108. In one implementation, the protection component 106 can include transistors 112. In one example, the transistors 112 are a set of field-effect transistors (FETs), such as, but not limited to, metal-oxide-semiconductor field-effect transistors (MOSFETs). The transistors 112 can be coupled to the battery 108. The transistors 112 can regulate battery current (e.g., charging and discharging of the battery 108). During a fault condition, the protection component 106 can provide an open circuit condition at the battery 108 and/or the component 104. For example, the transistors 112 can disconnect the battery 108 from the load 110 (e.g., one or more of the transistors 112 can be turned off) to protect the battery 108. The fault condition can include, but is not limited to, an under/over voltage supplied to the battery 108, a voltage unbalance of the battery 108, and/or an under/over current supplied to the battery 108. Accordingly, the transistors 112 can provide particularized protection directly to the battery 108.

In one implementation, the transistors 112 can be implemented as a set of redundant MOSFETs. One of the transistors 112 can be implemented in series with another one of the transistors 112 to form a bi-directional switch. Therefore, the transistors 112 can provide protection for the component 104 and/or the battery 108. The transistors 112 can allow for a component failure (e.g., a transistor failure, etc.) in the component 104 during charging/discharging of the battery 108. One of the transistors 112 can provide redundancy protection while charging the battery 108 and one of the transistors 112 can provide redundancy protection while discharging the battery 108. The transistors 112 can also allow the battery 108 to be replaced without interrupting operation of the system 100 by implementing a hot swap technique.

Additionally or alternatively, the protection component 106 can sense current, for example, through the transistors 112 or a sense resistor (shown in FIG. 7) and detect overcurrent to protect the battery 108. It can be appreciated that the protection component 106 can monitor various parameters, such as, but not limited to, voltage supplied to the battery, source voltage, load voltage, charging/discharging current, load current, circuit temperature, die temperature, etc. The protection thresholds associated with the various parameters can be fixed and/or programmable, and can be adjusted and/or defined based in part on the application and/or components utilized in system 100.

Further, it can be appreciated that the mechanical design of system 100 can include different component selections, component placements, etc., to achieve an optimal performance. Moreover, the primary power converter component 102, component 104, protection component 106, battery 108, and the load 110 can include most any electrical circuit(s), which in turn can include components and circuitry elements of any suitable values, in order to practice the implementations of the subject innovation. Furthermore, it can be appreciated that the components of system 100 can be implemented on one or more integrated circuit (IC) chips. For example, in one implementation, the component 104 and the protection component 106 can be implemented in a single IC chip. In other implementations, the primary power converter component 102, component 104, protection component 106 and the load 110 are fabricated on separate IC chips.

Figure 2:
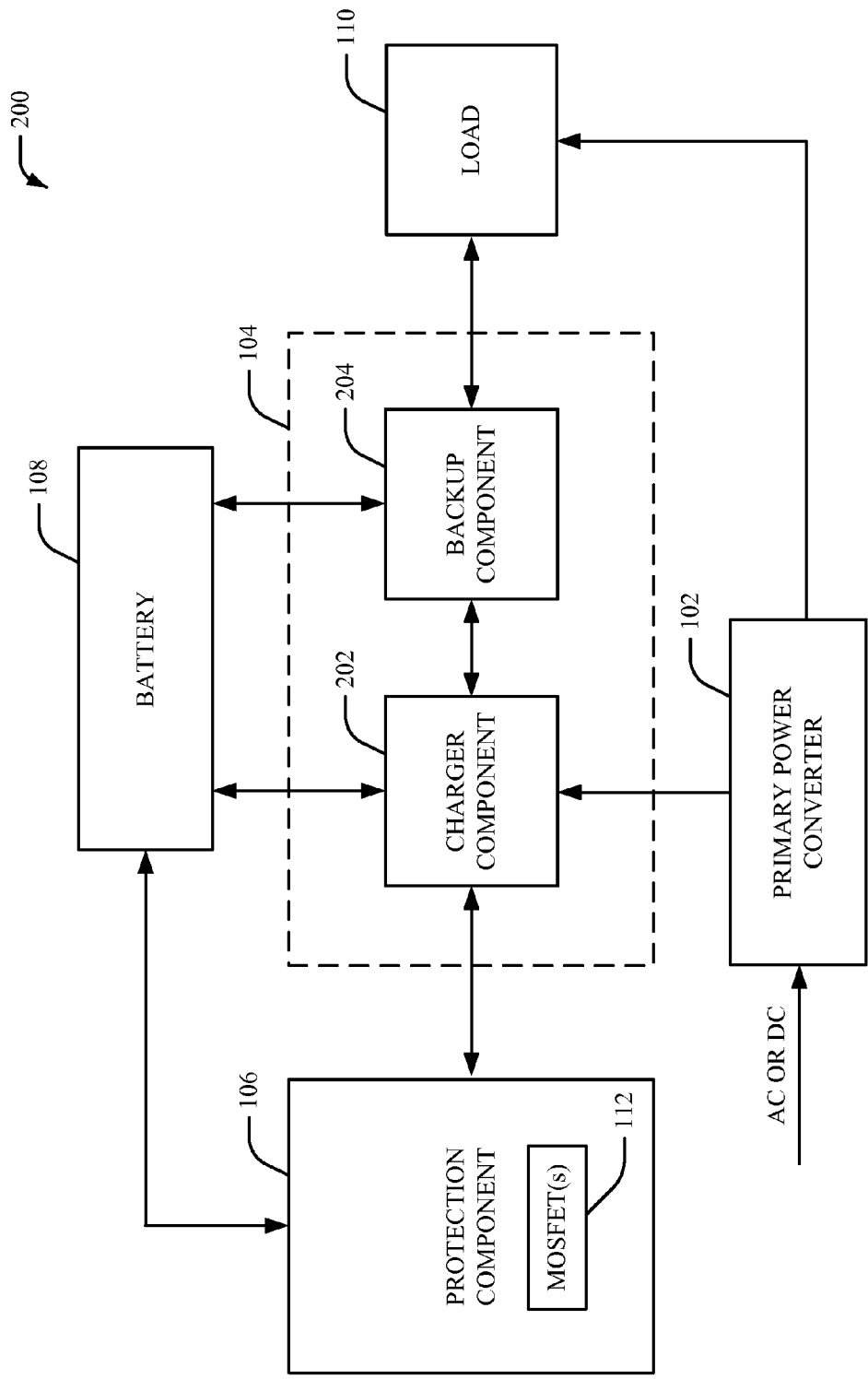
FIG. 2 illustrates an example functional block diagram implementation of the charger and backup components.

Referring now to FIG. 2, there is illustrated an example system 200 to implement the component 104. The component 104 includes a charger component 202 and a backup component 204. The charger component 202 is coupled to the primary power converter component 102, the protection component 106, the battery 108 and the backup component 204. The backup component 204 is coupled to the battery 108, the load 110 and the charger component 202. The charger component 202 can be configured to controllably deliver charging current and voltage to the battery 108 when power (e.g., an input power source) is provided from the primary power converter component 102. The output voltage of the battery 108 can vary with respect to time. For example, the output voltage of the battery 108 can vary between 9V and 14V. However, the load 110 generally requires a constant voltage (e.g., 12V). The backup component 204 can therefore be configured to controllably deliver battery power to the load 110 (e.g., a constant voltage to the load 110) when power is not provided from the primary power converter component 102. As a result, an uninterruptible supply of power can be provided to the load 110.

The charger component 202 and the backup component 204 can each employ a voltage converter. In one example, the charger component 202 and/or the backup component 204 employ buck converters. The charger component 202 can limit current to the battery 108. The charger component 202 can also control the voltage provided to the battery 108. Additionally, the charger component 202 can store a portion of power supplied by the primary power converter component 102 (e.g., store a portion of direct current (DC) power). As such, the charger component 202 can control the rate of transfer of the power supplied by the primary power converter component 102 to the battery 108. In one example, the charger component 202 can charge the battery 108.

The backup component 204 (e.g., the battery backup converter 204) can deliver power from the battery 108 during a failure (e.g., loss of an input power source). The backup component 204 can also regulate the voltage provided to load 110 while operating on the battery 108. In one example, the backup component 204 can be controllably configured to power the load 110 from the battery 108 by controlling a set of transistors implemented in the backup component 204. The backup component 204 can control the set of transistors by implementing pulse width modulation (PWM) (e.g., a PWM technique). In one example, the backup component 204 can deliver DC power to the load 110 when a power failure is detected. Therefore, stored power in the battery 108 can be used to drive the load 110 upon unavailability of the input power source (e.g., an alternating current (AC) power source).

Figure 3:
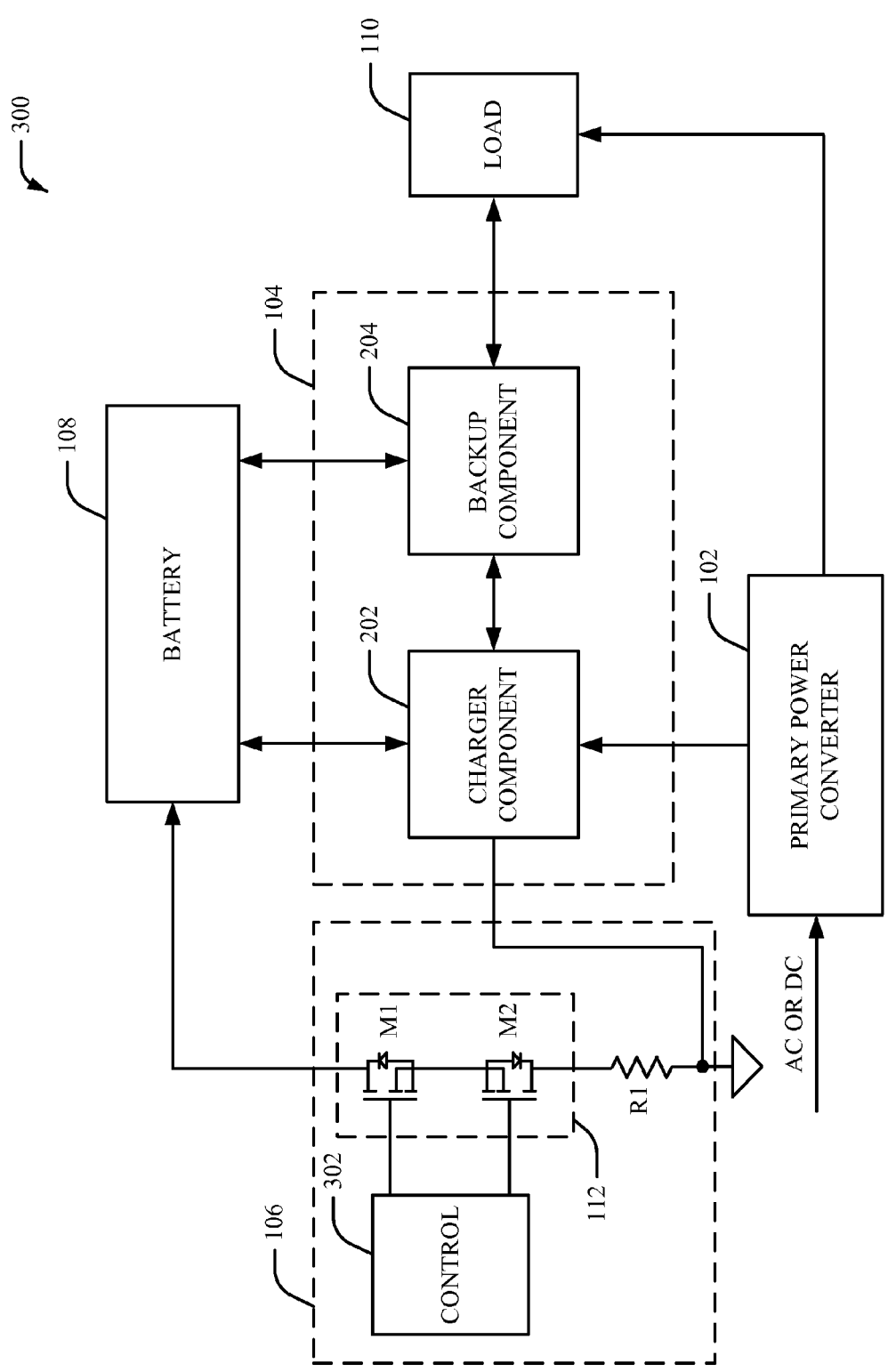
FIG. 3 illustrates an example functional block diagram implementation of the protection component.

Referring now to FIG. 3, there is illustrated an example system 300 for implementing the protection component 106. The protection component 106 includes the transistors 112 and a control component 302 (e.g., a controller 302). The transistors 112 can be implemented as a set of MOSFETs. In one example, the set of MOSFETs can be implemented in series. However, it is to be appreciated the number of transistors and/or the type of transistors can be varied depending on the design criteria of a particular implementation. The control component 302 can control the transistors 112 (e.g., turn the transistors 112 on or off). Additionally, the protection component 106 can include a resistor R1. The resistor R1 can be implemented to sense charging or discharging currents in the battery 108. However, it is to be appreciated that another type of current sensing mechanism can be implemented to sense charging or discharging currents in the battery 108. Furthermore, it is to be appreciated that the resistor R1 (e.g., the sensing mechanism) can be implemented as one or more resistors (e.g., one or more sensing mechanisms).

The transistors 112 can include a MOSFET M1 and a MOSFET M2. The MOSFET M1 can be coupled to the battery 108 and the MOSFET M2. In one example, the drain of the MOSFET M1 can be coupled to the battery 108 and the source of the MOSFET M1 can be coupled to the MOSFET M2. The gates of the MOSFET M1 and the MOSFET M2 can be coupled to the control component 302. The MOSFET M1 and the MOSFET M2 can control charging and discharging current for the battery 108 (e.g., by operating in a linear region of the MOSFET M1 and the MOSFET M2).

In one implementation, the MOSFET M1 and the MOSFET M2 can be implemented as a set of redundant MOSFETs. The MOSFET M1 can be implemented in series with the MOSFET M2 to form a bi-directional switch. The MOSFET M1, the MOSFET M2 and/or the backup component 204 can disconnect the battery 108 from the load 110. For example, the MOSFET M1 and/or the MOSFET M2 can be turned off (e.g., the MOSFET M1 and/or the MOSFET M2 can be switched to an open position). Therefore, the MOSFET M1 and the MOSFET M2 can provide protection for the charger component 202, the backup component 204 and/or the battery 108. The MOSFET M1 and the MOSFET M2 can allow for component failure in the charger component 202 and/or the backup component 204 during charging/discharging of the battery 108. The MOSFET M1 can provide redundancy protection while charging the battery 108 and the MOSFET M2 can provide redundancy protection while discharging the battery 108. The MOSFET M1 and the MOSFET M2 are generally both turned on or both turned off during operation. The MOSFET M1 and the MOSFET M2 can also allow the battery 108 to be replaced without interrupting operation of the system 100 by implementing a hot swap technique.

The control component 302 can sense current and/or voltage in the system 300 and control operation of the transistors 112 based on comparison of the sensed current and/or voltage values with respective threshold values. Typically, the control component 302 can control operation of the transistors 112 to provide protection, such as, but not limited to an under/over voltage supplied to the battery 108, a voltage unbalance of the battery 108, an input under voltage, voltage difference between input and output, and under/over current supplied to the battery 108. Once enabled, the output of the control component 302 can turn off the transistors 112.

During normal operation (e.g., when an input power source is available), the control component 302 can sense charging/discharging current of the battery 108. Moreover, the control component 302 can identify whether the sensed current is above an overcurrent threshold and disable (e.g., turn off, open, disconnect from the battery 108, etc.) the transistors 112 to protect the battery 108 and/or the component 104. The control component 302 can disconnect the transistors 112 from the battery 108 (e.g., turn off the transistors 112) until the current reduces below the overcurrent threshold. Typically, the control component 302 can monitor various parameters in the system 300, such as, but not limited to, voltage supplied to the battery, source voltage, load voltage, charging/discharging current, load current, sensed current, sensed voltage, circuit temperature, die temperature, etc. Moreover, the control component 302 can analyze the monitored parameters and control a gate of each of the transistors 112 based on the analysis. Based in part on the sensed current and voltage values, the control component 302 can apply one or more rules/policies to control operation (e.g., switching) of the transistors 112.

In one aspect, the control component 302 can compare a voltage supplied to the battery 108 to a predetermined threshold voltage value. Moreover, the control component 302 can delay operation of the transistors 112 until the voltage supplied to the battery 108 is below the predetermined threshold voltage value. As an example, the predetermined threshold value can be set by a manufacturer or can be defined and/or dynamically adjusted by a customer/user. Once conditions associated with the voltage supplied to the battery 108 are satisfied, the control component 302 can, instantaneously or almost instantaneously, turn on the transistors 112.

Additionally or optionally, the protection component 106 can include a current sensing component that can be employed to monitor the discharging/charging current of the battery 108. The control component 302 can compare the sensed current with a predetermined overcurrent threshold (e.g., set by a manufacturer and/or set/modified by a customer/user) and can disable the transistors 112 if the sensed current is greater than or equal to the predetermined overcurrent threshold. On disabling the transistors 112, the transistors 112 can be instantaneously or almost instantaneously turned off. In this regard, the battery 108 and/or the charger and backup converter component 104 can be protected against overcurrent.

It can be appreciated that the control component 302 can include most any electrical circuit(s) that can include components and/or circuitry elements of any suitable value in order to practice the implementationss of the subject specification. For example, the control component 302 can include comparators and can operate in the analog or digital domain. It is also to be appreciated that the control component 302 can include one or more control components. For example, in one implementation, the control component 302 includes a single control component to control the MOSFET M1 and the MOSFET M2. In another implementation, the control component 302 includes separate control components to control the MOSFET M1 and the MOSFET M2. In yet another implementation, a first control component 302 is implemented to control the MOSFET M1 and a second control component 302 is implemented to control the MOSFET M2. Further, the control component 302 can include most any circuit that can generate an output signal, which instantaneously or almost instantaneously switches one or more of the transistors 112 on or off.

In one example, the transistors 112 allow the battery 108 to be replaced without interrupting the system 300 (e.g., without interrupting power provided to the load 110) by using a hot swap technique. The transistors 112 can be disconnected from the battery 108 under any fault conditions such as, but not limited to, under/over voltage supplied to the battery 108, a voltage unbalance of the battery 108, an under/over current supplied to the battery 108, charging/discharging current limiting for hot swap, open circuit voltage sense of the battery 108, and/or disconnect of the battery 108. All of the transistors 112 (e.g., the MOSFET M1 and the MOSFET M2) can be turned on during a backup operation of the battery 108.

Figure 4:
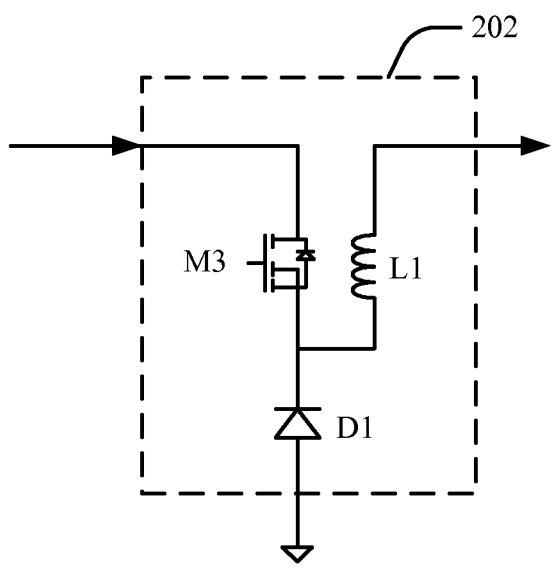
FIG. 4 illustrates an example circuit implementation of the charger component.

Referring now to FIG. 4, there is illustrated an example of the charger component 202. The charger component 202 includes a transistor M3, a diode D1 and an inductor L1. The transistor M3, diode D1 and inductor L1 can be implemented as a voltage converter. In one example, the transistor M3, diode D1 and inductor L1 is implemented as a step-down voltage converter. In one implementation, the transistor M3, diode D1 and inductor L1 can be implemented as a buck converter. One terminal of the transistor M3 can be coupled to the protection component and another terminal of the transistor M3 can be coupled to the diode D1, the inductor L1 and a common terminal. The cathode terminal of the diode D1 can be coupled to the transistor M3, the inductor L1 and the common terminal. The anode terminal of the diode D1 can be coupled to a ground potential. One terminal of the inductor L1 can be coupled to the transistor M3, the diode D1 and a common terminal. The other terminal of the inductor L1 can be coupled to the battery 108 and the backup component 204.

Figure 5:
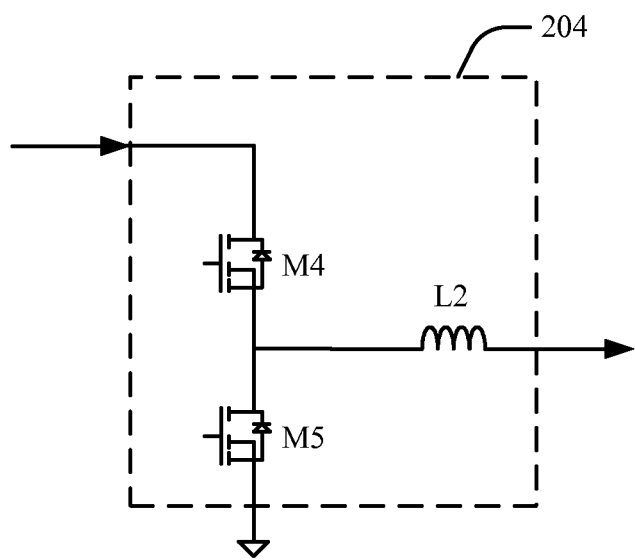
FIG. 5 illustrates an example circuit implementation of the backup component.

Referring now to FIG. 5, there is illustrated an example of the backup component 204. The backup component 204 includes a transistor M4, a transistor M5 and an inductor L2. The transistor M4, transistor M5 and inductor L2 can be implemented as a voltage converter (e.g., a buck converter). The battery component 204 can perform bidirectional power flow. One terminal of the transistor M4 can be coupled to the battery 108 and the charger component 202 and another terminal of the transistor M4 can be coupled to the transistor M5, the inductor L2 and a common terminal. One terminal of the transistor M5 can be coupled to the transistor M4, the inductor L2 and the common terminal. Another terminal of the transistor M5 can be coupled to a ground potential. One terminal of the inductor L2 can be coupled to the transistor M4, the transistor M5 and the common terminal. The other terminal of the inductor L2 can be coupled to the load 110. The backup component 204 can control the transistor M4 and the transistor M5 by implementing a PWM technique.

Although the circuit 202 (e.g., the charger component 202) and the circuit 204 (e.g., the backup component 204) are illustrated to comprise the MOSFETs M3-M5, the diode D1, the inductor L1 and the inductor L2, it is to be appreciated that most any circuit comprising most any electrical element can be utilized to generate the voltage supplied to the battery 108 and/or the load 110.

Figure 6:
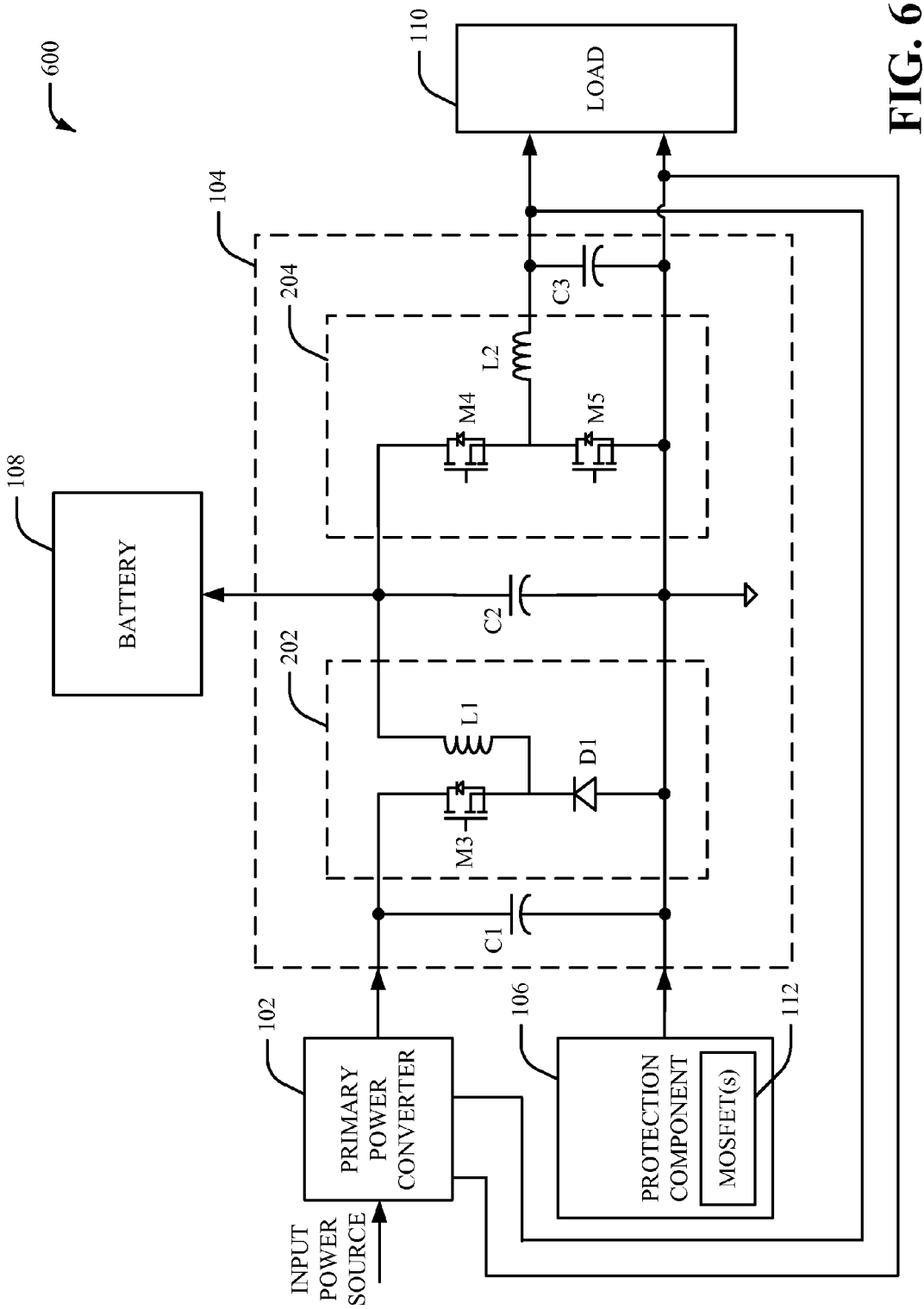
FIG. 6 illustrates an example implementation of an uninterruptible power supply system.

Referring now to FIG. 6, there illustrated is an example circuit 600 of another implementation of the component 104. The component 104 includes the charger component 202 and the backup component 204. Additionally, the component 104 includes a capacitor C1, a capacitor C2, and a capacitor C3. The capacitor C2 can be implemented to store energy in order to charge the battery 108. The capacitor C2 can be implemented to regulate voltage delivered to the battery 108. The capacitor C2 can also allow the battery 108 to be separated from the component 104. The capacitor C3 can be implemented to regulate voltage delivered to the load 110.

The MOSFET M3 and the diode D1 are coupled to the capacitor C1. The capacitor C1 is also coupled to the primary power converter component 102 and the protection component 106. The primary power converter component 102, the MOSFET M3 and the capacitor C1 are all coupled to a common terminal (e.g., a common node). The diode D1, the MOSFET M5, the capacitor C1, the capacitor C2, the capacitor C3, the primary power converter component 102, the protection component 106, the load 110 and a ground potential are all coupled to another common terminal (e.g., a common node).

The inductor L1 and the diode D1 are coupled to the capacitor C2. The MOSFET M4 and the MOSFET M5 are also coupled to the capacitor C2. Additionally, the capacitor C2 is coupled to the battery 108 and a potential ground. The inductor L1, the MOSFET M4, the battery 108 and the capacitor C2 are all coupled to a common terminal (e.g., a common node).

The inductor L2 and the MOSFET M5 are also coupled to the capacitor C3. The capacitor C3 also is coupled to the load 110 and the primary power converter component 102. The inductor L2, the primary power converter component 102, the load 110 and the capacitor C3 are all coupled to a common terminal (e.g., a common node). The capacitor C1, the capacitor C2 and the capacitor C3 can have suitable capacitance values (or ratios) depending on the application.

Figure 7:
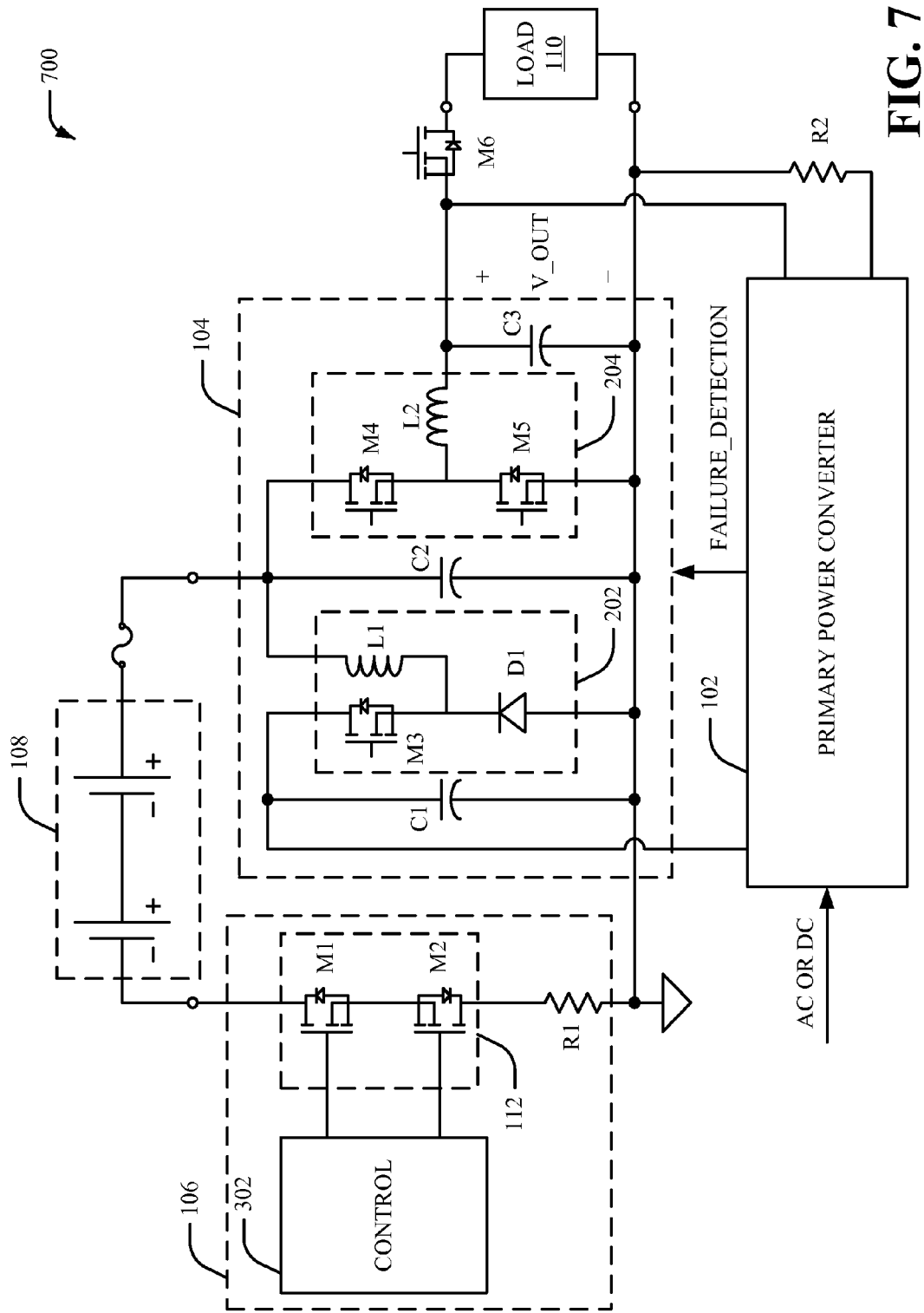
FIG. 7 illustrates another example implementation of an uninterruptible power supply system.

Referring now to FIG. 7, there illustrated is an example system 700 for implementing an uninterruptible power supply system with sensing capabilities. The system 700 further includes a resistor R1, a resistor R2 and a transistor M6. The resistor R1 can be implemented to sense charging or discharging currents in the battery 108. However, another type of current sensing component can be implemented to sense charging or discharging current. In one example, the resistor R1 is included in the protection circuit 106. In another example, the resistor R1 is implemented separate from the protection circuit 106. The resistor R2 can be implemented to sense output current from the primary power converter 102. However, another type of current sensing component can be implemented to sense the output current from the primary power converter 102. The transistor M6 can be implemented between the component 104 and the load 110.

The transistor M6 can provide parallel operation with a different power supply system. In one example, the transistor M6 is implemented as an ORing FET. The resistor R1 and the resistor R2 can have suitable resistance values (or ratios) depending on the application. The backup component 204 and the MOSFETs M1 and M2 can provide redundancy for failure protection. If the backup component 204 fails, the MOSFETs M1 and M2 can disconnect the battery 108 from the load 110. If the MOSFET M1 and/or the MOSFET M2 fail, the backup component 204 can detect a failure and/or disconnect the battery 108 from the load 110.

During normal operation (e.g., when a power failure is not detected), the control component 302 can sense current through a current sense resistor R1. Moreover, the control component 302 can identify whether the sensed current is above an overcurrent threshold and disable (e.g., turn off, open, disconnect from the battery 108, etc.) the transistors 112 to protect the battery 108 and/or the component 104. The control component 302 in turn switches off the transistors 112 until the current reduces below the overcurrent threshold.

The system 700 further includes a failure detection signal (e.g., a signal FAILURE_DETECTION). The primary power converter component 102 can generate the signal FAILURE_DETECTION when a power failure is detected (e.g., when the input power source becomes unavailable). The component 104 can receive the FAILURE_DETECTION signal to switch between the charger component 202 and the backup component 204 (e.g., switch between a charging mode and a backup mode). For example, when the FAILURE_DETECTION signal is received from the primary power converter component 102, the charger component 202 can be turned off and the backup component 204 can be turned on to deliver power from the battery 108 to the load 110. When the FAILURE_DETECTION signal is not received from the primary power converter component 102, the backup component 204 can be turned off and the charger component 202 can be turned on to deliver charging current and voltage to the battery 108.

Figure 8:
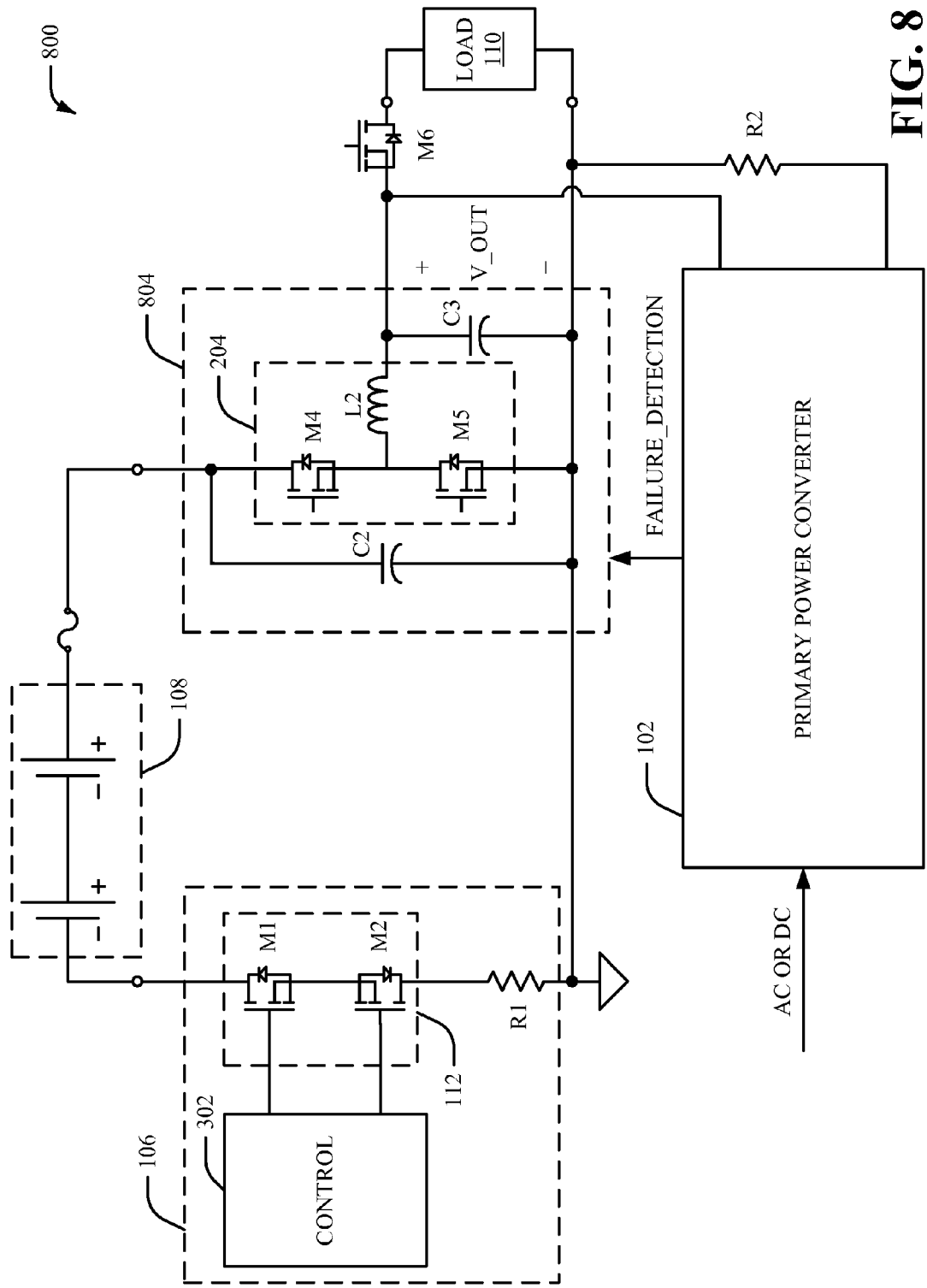
FIG. 8 illustrates yet another example implementation of an uninterruptible power supply system.

Referring now to FIG. 8, there illustrated is another example system 800 for implementing an uninterruptible power supply system. The system 800 includes a backup converter component 804. The backup converter component 804 can be implemented as a buck converter. The backup converter component 804 includes the backup component 204, the capacitor C2 and the capacitor C3. The backup component 204 can regulate voltage across the capacitor C2 when the battery 108 is charged up. For example, the backup component 204 can be implemented as a boost converter under a charging condition. The boost converter can operate in a discontinuous inductor current conduction mode with the MOSFET M4 disabled without pulse width modulation (PWM) switching during charging of the battery 108. The backup component 204 can also regulate both the output voltage from the battery 108 and the load current (e.g., current provided to the load 110). The backup component 204 can also deliver backup power by implementing PWM between the transistor M4 and the transistor M5. The backup component 204 can utilize high rated current for battery backup. Additionally, the backup component 204 can regulate voltage across the capacitor C2 in order to regulate charging current for the battery 108. The MOSFET M1 in the protection circuit 106 can limit the charging current of the battery 108 (e.g., by operating in a linear region of the MOSFET M1). Both the MOSFET M1 and the MOSFET M2 can be completely turned on during the battery backup operation. The output voltage of the system 800 is generally lower than the voltage of the battery 108.

The system 800 is implemented without the charger component 202 (e.g., without a separate charger component). The backup converter component 804 (e.g., the backup component 204) and the MOSFETs M1 and M2 can provide redundant failure protection. The MOSFET M1 can control the current provided to the battery 108 to charge the battery 108. Additionally, the MOSFET M1 can be configured to limit the charging current of the battery 108. The MOSFET M2 can control discharging current provided by the battery 108. As such, the charger component 202 can be removed from the UPS system.

In one implementation, the capacitor C2 is coupled to the MOSFET M4 and the battery 108. The capacitor C2 is also be coupled to the MOSFET M5, the capacitor C3, the primary power converter component 102, the protection component 106 and the load 110. The MOSFET M4, the battery 108 and the capacitor C2 are all coupled to a common terminal (e.g., a common node). The MOSFET M5, the capacitor C3, the primary power converter component 102 (e.g., the resistor R2), the protection component 106 (e.g., the resistor R1), the load 110 and a ground potential are all coupled to another common terminal (e.g., a common node).

The capacitor C3 is coupled to the inductor L2, the MOSFET M6 and the primary power converter component 102. The capacitor C3 is also be coupled to the MOSFET M5, the capacitor C2, the primary power converter component 102, the protection component 106 and the load 110. The inductor L2, the MOSFET M6, the primary power converter component 102 and the capacitor C3 are all coupled to a common terminal (e.g., a common node). The MOSFET M5, the capacitor C2, the primary power converter component 102 (e.g., the resistor R2), the protection component 106 (e.g., the resistor R1), the load 110 and a ground potential are all coupled to another common terminal (e.g., a common node).

Figure 9:
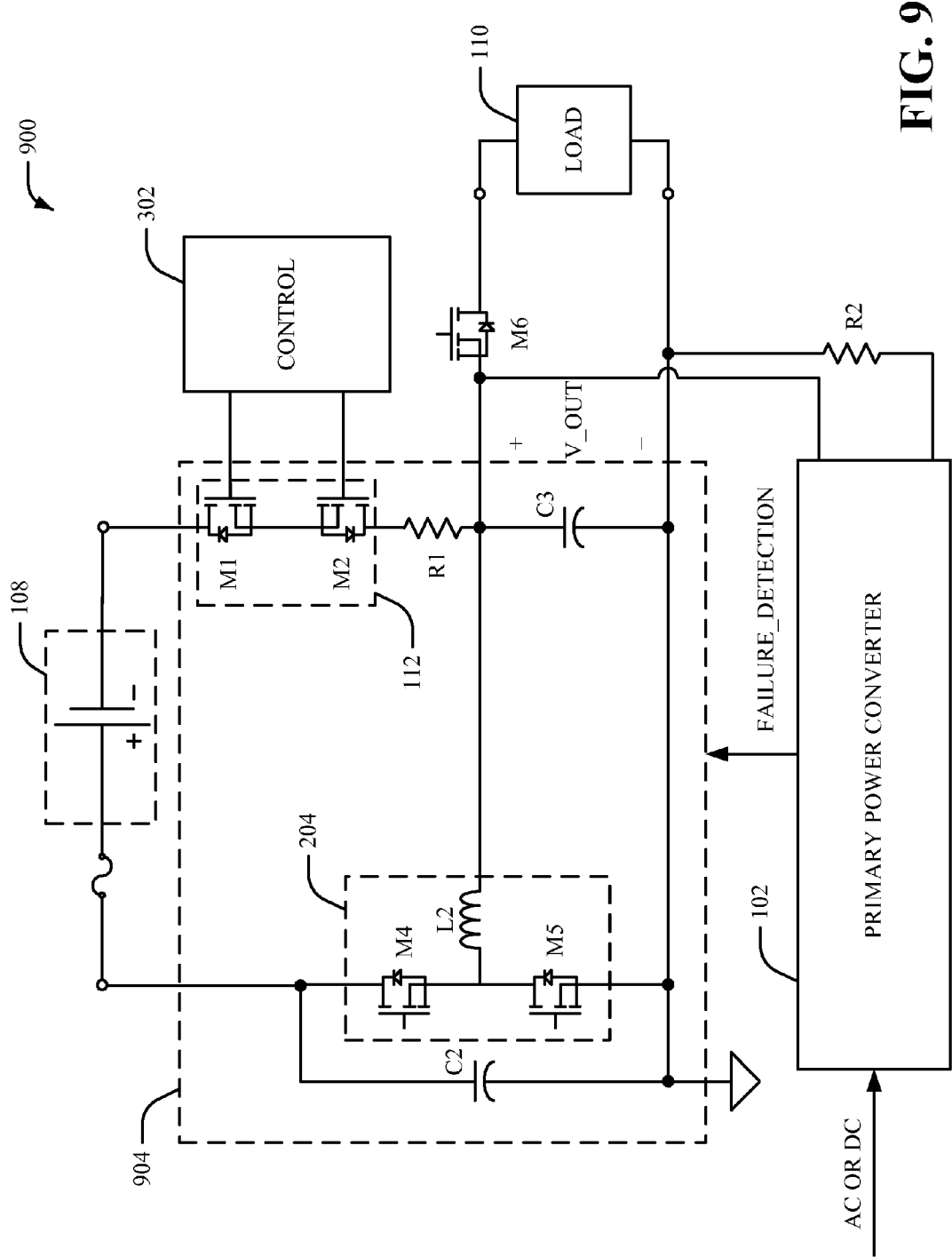
FIG. 9 illustrates yet another example implementation of an uninterruptible power supply system.

Referring now to FIG. 9, there illustrated is another example system 900 for implementing an uninterruptible power supply system. The system 900 includes a backup converter component 904. The backup converter component 904 can be implemented as a buck-boost converter. The backup converter component 904 includes the backup component 204, the capacitor C2, the capacitor C3, the transistors 112 and the sensing resistor R1. The backup component 204 can regulate voltage across the capacitor C2. The backup component 204 can also deliver backup power by implementing pulse width modulation (PWM) between the transistor M4 and the transistor M5. The transistor M4 and the transistor M5 can regulate voltage difference between the capacitor C2 and the capacitor C3 at a voltage level that is the same as or higher than voltage level of the battery 108. For example, the backup component 204 can be implemented as a boost converter under a charging condition. The boost converter can operate in a discontinuous inductor current conduction mode with the MOSFET M4 disabled without PWM switching during charging of the battery 108. The MOSFET M1 can limit the charging current of the battery 108. The MOSFET M2 can regulate the discharging current of the battery 108. Both the MOSFET M1 and the MOSFET M2 can be completely turned on during the battery backup operation. The output voltage of the system 900 can be higher or lower than the voltage of the battery 108.

The system 900 is implemented without the charger component 202 (e.g., without a separate charger component). In one example, the backup component 204 can implement a boost converter if the voltage input of the backup component 204 is lower than the voltage needed for the load 110. The backup component 204 can boost the voltage from the battery 108 by charging the capacitor C2. In another example, the backup component 204 can implement a buck converter (e.g., a step-down converter) if the voltage input of the backup component 204 is higher than the voltage needed for the load 110. The MOSFET M1 can be used to charge the battery 108 and/or regulate the charging current of the battery 108. The MOSFET M2 can be used to discharge the battery 108 and/or regulate the discharging current of the battery 108. As such, the charger component 202 can be removed from the UPS system. During discharging of the battery 108, both the MOSFET M1 and the MOSFET M2 can be completely turned on. In the system 900, the ground potential of the battery 108 can be different than the ground potential of the backup component 204. The transistors 112 (e.g., the MOSFET M1 and the MOSFET M2) can be implemented on the backup converter component 904. Therefore, the transistors 112 can be implemented separate from the control component 302. In another example, the control component 302 can be implemented on the backup converter component 904 with the transistors 112. The backup converter component 904 (e.g., the backup component 204) and the MOSFETs M1 and M2 can provide redundant failure protection.

In one implementation, the MOSFET M4 is coupled to the capacitor C2 and the battery 108 on a common terminal (e.g., a common node). The MOSFET M4 is also coupled to the MOSFET M5 and the inductor L2 on a common terminal (e.g., a common node). The MOSFET M5 is also coupled to the capacitor C2, the capacitor C3, the resistor R2, the primary power converter component 102, the load 110 and a ground potential on a common terminal (e.g., a common node). Additionally, the resistor R2 is coupled to the primary power converter component 102. Another terminal of the inductor L2 is coupled to the capacitor C3, the resistor R1, the primary power converter component 102, and the MOSFET M6 on a common terminal (e.g., a common node). Additionally, the MOSFET M6 is coupled to the load 110. Furthermore, one terminal of the MOSFET M1 is coupled to the battery and another terminal of the MOSFET M1 is coupled to the MOSFET M2. One terminal of the MOSFET M2 is coupled to the MOSFET M1 and another terminal of the MOSFET M2 is coupled to the resistor R1. The gate of the MOSFET M1 and the gate of the MOSFET M2 are both coupled to the control component 302.

Figure 10:
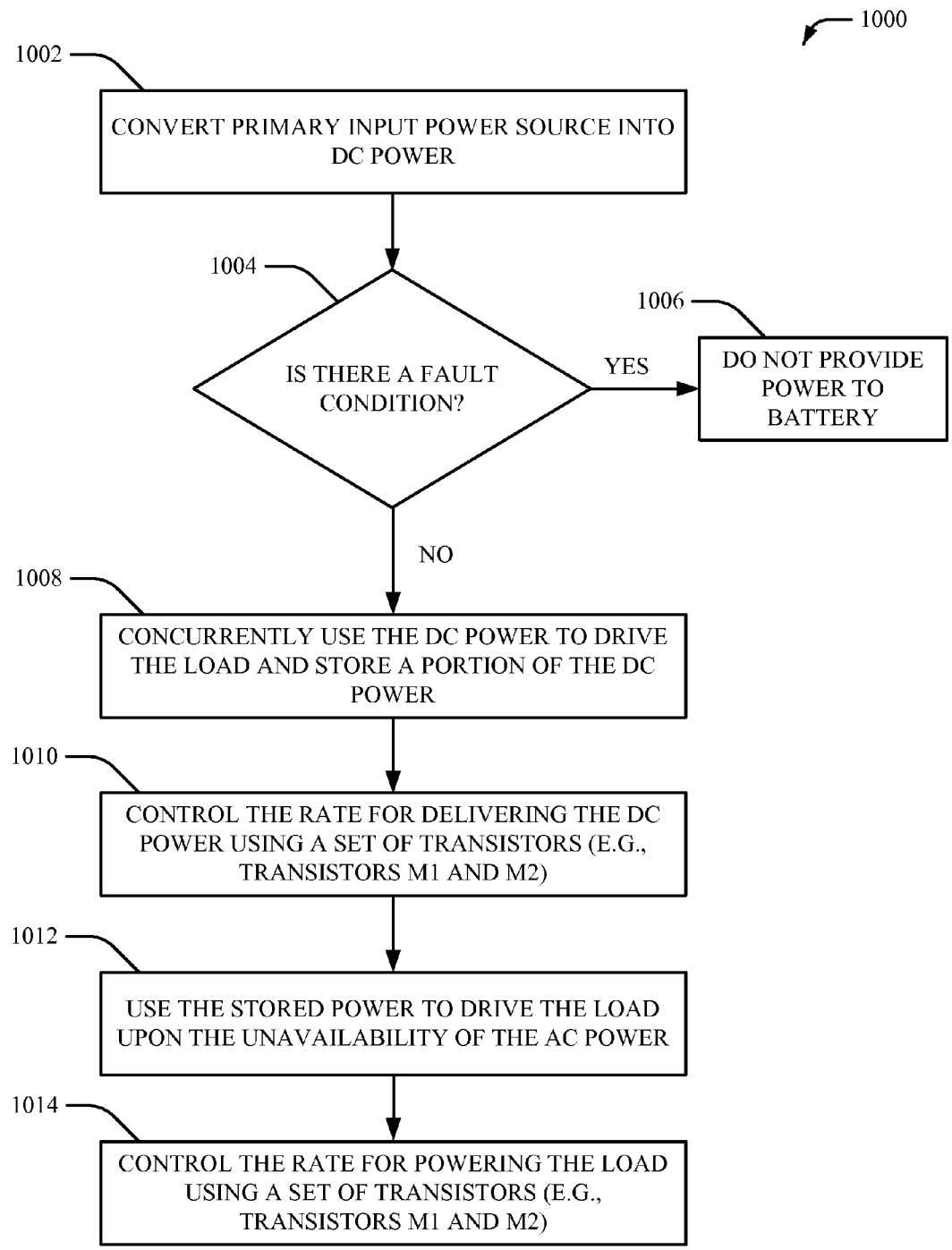
FIG. 10 illustrates an example methodology for supplying uninterruptible power to a load.
Figure 11:
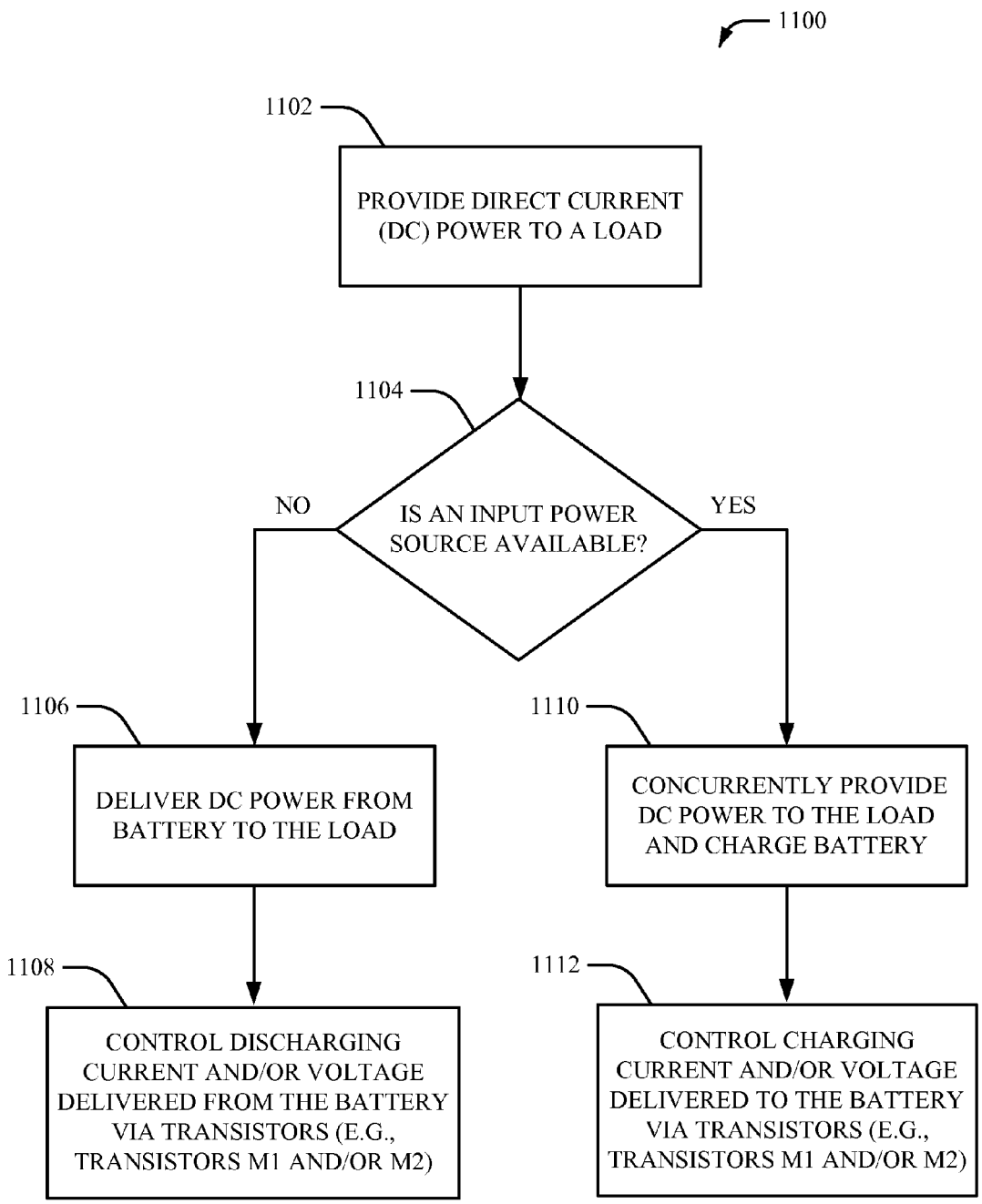
FIG. 11 illustrates another example methodology for supplying uninterruptible power to a load.
Figure 12:
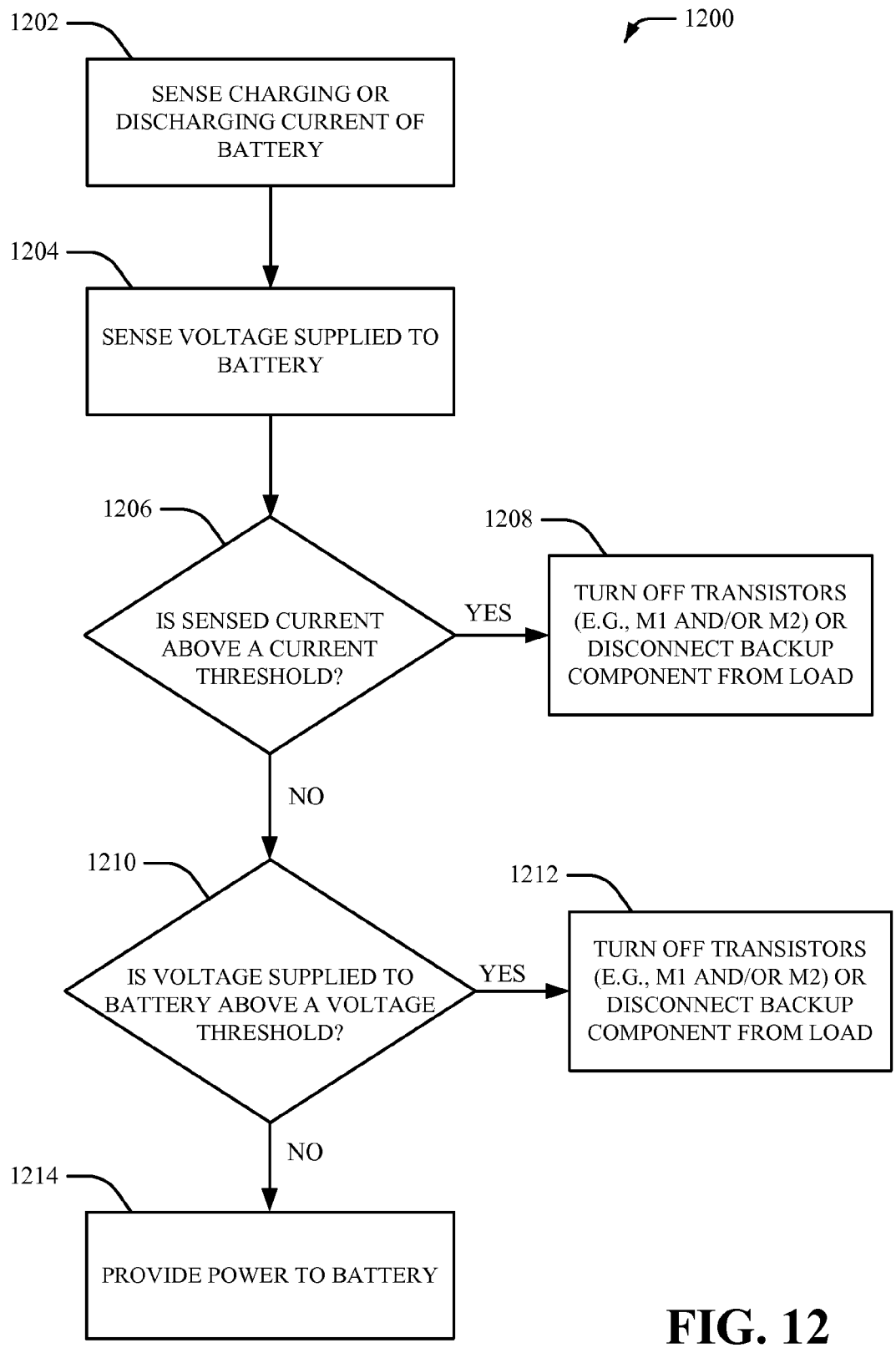
FIG. 12 illustrates an example methodology for controlling transistors to provide protection for the uninterruptible power supply system.

FIGS. 10-12 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media.

Referring to FIG. 10 there illustrated is a methodology 1000 for implementing an uninterruptible power supply, according to an aspect of the subject innovation. As an example, methodology 1000 can be utilized in various power supply applications, such as, but not limited to, distributed power systems, high availability servers, disk arrays, powered insertion boards, etc. Moreover, the uninterruptible power supply system is configured to provide a continuous supply of power to a load while implementing a protection component. Specifically, methodology 1000 enables utilization of a set of transistors (e.g., MOSFETs) to provide the protection and uninterruptible power to the load.

Initially, the power supply can be switched on and/or connected to the load. At 1002, a primary input power source can be converted (e.g., using a primary power converter 102) into DC power. In one example, an AC primary input power source can be converted into DC power. In another example, a voltage level of a DC primary input power source can be converted (e.g., boosted or stepped-down) into a different DC voltage level. At 1004, it can be determined (e.g., using the control component 302) whether there is a fault condition. For example, the fault condition can include, but is not limited to, an under/over voltage supplied to a battery, a voltage unbalance of a battery, and/or an under/over current supplied to a battery. In one aspect, if determined that there is a fault condition, the methodology 1000 proceeds to 1006 and does not provide power to the battery. Specifically, the converted DC power is not used to provide power to the battery. Alternatively, if determined that there is not a fault condition, the methodology 1000 proceeds to 1008. At 1008, DC power can be concurrently used to drive the load and store a portion of the DC power (e.g., using a backup component 204). Specifically, the portion of the DC power can be stored in the battery. At 1010, the rate for delivering the DC power can be controlled using a set of transistors (e.g., transistors M1 and M2). In particular, the charging current and voltage of the battery 108 can be regulated using the transistors M1 and M2. For example, the rate for delivering power or energy to the battery 108 can be controlled using the transistors M1 and M2. Therefore, the amount of energy available to the battery 108 can be controlled. At 1012, the stored power (e.g., power from the battery 108) can be used to drive the load upon the unavailability of the AC power. At 1014, the rate for powering the load can be controlled using a set of transistors (e.g., transistors M1 and M2). In particular, the discharging current and voltage of the battery can be regulated using the transistors M1 and M2. Therefore, a continuous supply of power can be provided to the load and/or controlled.

FIG. 11 illustrates an example methodology 1100 for managing a power failure in an uninterruptible power supply in accordance with an aspect of the subject disclosure. At 1102, DC power, for example, can be provided to a load. At 1104, it can be determined (e.g., using a primary power converter component 102) if an input power source is available. In one aspect, if determined that an input power source is not available, the methodology 1100 proceeds to 1106. At 1106, DC power from a battery can be delivered (e.g., using a battery 108) to the load. At 1108, discharging current and/or voltage delivered from the battery can be controlled via transistors (e.g., transistors M1 and/or M2). For example, a rate for powering the load can be controlled by operating in a linear region of the MOSFET M1 and/or the MOSFET M2. Alternatively, if determined that an input power source is available, the methodology 1100 proceeds to 1110. At 1110, DC power can be provided to the load and a battery can be charged (e.g., using a primary power converter component 102). At 1112, the charging current and/or voltage delivered to the battery can be controlled via transistors (e.g., transistors M1 and/or M2). For example, a rate for delivering the DC power to the battery can be controlled by operating in a linear region of the MOSFET M1 and/or the MOSFET M2.

FIG. 12 illustrates an example methodology 1200 for controlling transistors to provide protection in accordance with an aspect of the subject disclosure. At 1202, charging/discharging current of a battery can be sensed (e.g., using a control component 302). At 1204, voltage supplied to a battery can be sensed (e.g., using a control component 302). At 1206, it can be determined (e.g., using a control component 302) whether the sensed current is above a current threshold. In one aspect, if determined that the sensed current is above the current threshold, the methodology 1200 proceeds to 1208. At 1208, transistors connected to the battery can be turned off (e.g., using a control component 302). Alternatively, a backup component (e.g., a backup component 204) connected to the battery can be disconnected from a load. For example, the transistor M1 and/or the transistor M2 can disconnect the battery 108 from the load 110 or the backup component 204 can disconnect the battery 108 from the load 110. Alternatively, if determined that the sensed current is not above the current threshold, the methodology 1200 proceeds to 1210. At 1210, it can be determined (e.g., using a control component 302) whether the voltage supplied to the battery is above a voltage threshold. In one aspect, if determined that the voltage supplied to the battery is above a voltage threshold, the methodology 1200 proceeds to 1212. At 1212, the transistors connected to the battery can be turned off (e.g., using a control component 302). Alternatively, a backup component (e.g., a backup component 204) connected to the battery can be disconnected from a load. For example, the transistor M1 and/or the transistor M2 can disconnect the battery 108 from the load 110 or the backup component 204 can disconnect the battery 108 from the load 110. Alternatively, if determined that the voltage supplied to the battery is not above a voltage threshold, the methodology 1200 proceeds to 1214. At 1214, power can be provided to the battery. As such, the methodology 1200 can provide redundant failure protection via transistors (e.g., the transistors M1 and M2) and a backup component (e.g., the backup component 204).

What has been described above includes examples of the implementations of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated implementations of the subject disclosure is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Further, the word "coupled" is used herein to mean direct or indirect electrical or mechanical coupling.

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not illustrated herein.

In regards to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system configured to provide an uninterruptible power supply, comprising:
    a power converter component that concurrently provides power to a load and charges a battery by using a primary power source;
    a backup-charger component, including:
        a first power storage element coupled to an output of the power converter component and a protection component;
        a second power storage element coupled in parallel with the battery and the protection component;
        a backup device that is coupled to the battery and the power converter component, the backup device including a voltage converter and being configured to provide power from the battery to a load when a primary power failure is detected in the power converter component, wherein the second power storage element is coupled to the backup device, the backup device controllably delivers power from the battery to the load when a primary power failure is detected in the power converter component, and
        a charging device that is coupled to the backup device, the battery, the power converter component, the protection component, and the first power storage element and configured to charge the battery from power provided by the power converter component, wherein the first power storage element coupled to the charging device stores a portion of power supplied by the power converter component to vary a rate of transfer of power supplied by the power converter component to the battery; and
    the protection component, including a set of serially connected transistors coupled in series to the battery that controls charging current and discharging current of the battery by operating in a linear region of the transistors.

2. The system of claim 1, wherein the set of transistors form a bi-directional switch.

3. The system of claim 1, wherein the backup device and the set of transistors provide redundancy for disconnecting the battery from the load.

4. The system of claim 1, wherein the backup device is a buck converter.

5. The system of claim 1, wherein the backup device is a buck-boost converter.

6. The system of claim 1, wherein a control component turns off the set of transistors during a fault condition.

7. The system of claim 1, wherein the set of transistors is coupled to a sensing component configured to sense charging current and discharging current of the battery.

8. The system of claim 1, wherein the power converter component generates a signal in response to the primary power failure.

9. The system of claim 1, wherein the set of transistors and the load are coupled to a common terminal.

10. The system of claim 1, wherein the backup device implements a pulse width modulation (PWM) technique to controllably deliver the power to the load.

11. The system of claim 1, wherein the set of transistors allow the battery to be disconnected from the load.

12. The system of claim 1, wherein the backup device regulates voltage delivered from the battery to the load.

13. The system of claim 1, wherein the set of transistors and the backup device are coupled to a common terminal.

14. A method for supplying uninterruptible power, comprising:
    converting primary power into direct current (DC) power by a power converter component that concurrently provides power to a load and charges a battery by using a primary power source;
    using a component including
        a first power storage element coupled to an output of the power converter component and a protection component;
        a second power storage element coupled in parallel with the battery and the protection component;
        a backup component that is coupled to the battery and the power converter component, the backup component including a voltage converter and being configured to provide power from the battery to a load when a primary power failure is detected in the power converter component, and
        a charger component that is coupled to the backup component, the battery, the power converter component, the protection component, and the first power storage element and configured to charge the battery from power provided by the power converter component,
    the protection component including a set of serially connected transistors coupled in series to the battery,
    controlling a rate for delivering the DC power to the battery by operating in a linear region of a first transistor in the set of transistors and using a portion of the DC power stored in the second power storage element to deliver the DC power to the battery;
    using stored DC power in the second power storage element to drive the load upon unavailability of the primary power; and
    controlling a rate for powering the load by operating in a linear region of a second transistor in the set of transistors.

15. The method of claim 14, further comprising: turning off the set of transistors to disconnect the battery from the load in response to an occurrence of a fault condition.

16. The method of claim 14, wherein the controlling the rate for delivering the DC power to the battery includes sensing a charging current.

17. The method of claim 16, further comprising: opening the set of transistors in response to a determination that the sensed charging current is above a threshold value.

18. A power supply, comprising:
    a power converter component that concurrently provides power to a load and charges a battery by using a primary power source;

a component, including:
- a first power storage element coupled to an output of the power converter component and a protection component;
- a second power storage element coupled in parallel with the battery and the protection component;
- a backup component that is coupled to the battery and the power converter component, the backup component including a voltage converter and being configured to provide power from the battery to a load when a primary power failure is detected in the power converter component,
   wherein the second power storage element coupled to the backup component controllably delivers power from the battery to the load when a primary power failure is detected in the power converter component, and
- a charger component that is coupled to the backup component, the battery, the power converter component, the protection component, and the first power storage element and configured to charge the battery from power provided by the power converter component,
   wherein the first power storage element coupled to the charger component stores a portion of power supplied by the power converter component to vary a rate of transfer of power supplied by the power converter component to the battery; and the protection component including a set of metal-oxide-semiconductor field-effect transistors (MOSFETs) connected in series and coupled in series to the battery that control charging current and discharging current of the battery by operating in a linear region of the MOSFETs; and a control component that disconnects the battery from the load during a fault condition via the set of MOSFETs.

* * * * *